(12) United States Patent
Schnabel, Jr.

(10) Patent No.: US 7,287,401 B2
(45) Date of Patent: Oct. 30, 2007

(54) SYSTEM AND METHOD FOR CYLINDRICALLY FORMING GLASS SHEETS

(75) Inventor: James P. Schnabel, Jr., Holland, OH (US)

(73) Assignee: Glasstech, Inc., Perrysburg, OH (US)

( * ) Notice: Subject to any disclaimer, the term of this patent is extended or adjusted under 35 U.S.C. 154(b) by 141 days.

(21) Appl. No.: 10/865,005

(22) Filed: Jun. 10, 2004

(65) Prior Publication Data

US 2005/0274146 A1    Dec. 15, 2005

(51) Int. Cl.
*C03B 27/00* (2006.01)

(52) U.S. Cl. .............. 65/104; 65/114; 65/349; 65/370.1

(58) Field of Classification Search ............ 65/106, 65/107, 273, 275, 287–291, 114, 118, 119, 65/370.1, 268, 349
See application file for complete search history.

(56) References Cited

U.S. PATENT DOCUMENTS

| | | | |
|---|---|---|---|
| 4,540,426 A * | 9/1985 | Bocelli et al. ............ 65/273 |
| 4,883,527 A * | 11/1989 | McMaster et al. ......... 65/273 |
| 4,966,618 A * | 10/1990 | Letemps et al. ........... 65/106 |
| 5,368,625 A | 11/1994 | Mizusugi |
| 5,443,609 A * | 8/1995 | Lehto ..................... 65/268 |
| 5,498,275 A | 3/1996 | Reunamaki |
| 5,545,245 A | 8/1996 | Mizusugi |
| 5,556,444 A | 9/1996 | Reunamaki |
| 5,697,999 A | 12/1997 | Reunamaki |
| 5,735,922 A | 4/1998 | Woodward et al. |
| 5,928,398 A * | 7/1999 | Lehto ..................... 65/104 |
| 5,970,745 A * | 10/1999 | Lehto ..................... 65/17.1 |
| 6,192,710 B1 | 2/2001 | Takeda et al. |
| 6,363,753 B1 * | 4/2002 | Yoshizawa et al. ........ 65/287 |
| 6,378,339 B1 | 4/2002 | Zalesak et al. |
| 6,513,348 B2 * | 2/2003 | Shetterly et al. ......... 65/104 |
| 6,578,383 B2 | 6/2003 | Bennett et al. |
| 6,722,160 B1 * | 4/2004 | Nemugaki et al. ........ 65/114 |
| 6,783,358 B1 * | 8/2004 | Lewandowski et al. .... 432/144 |
| 2002/0189291 A1* | 12/2002 | Bennett et al. ........... 65/106 |
| 2002/0189295 A1* | 12/2002 | Bennett et al. ........... 65/173 |

FOREIGN PATENT DOCUMENTS

| | | |
|---|---|---|
| FR | 2 221 409 | 10/1974 |
| WO | WO 02/102726 A1 | 12/2002 |
| WO | WO 02/102727 A1 | 12/2002 |
| WO | WO 03/010100 A1 | 2/2003 |

* cited by examiner

*Primary Examiner*—Carlos Lopez
(74) *Attorney, Agent, or Firm*—Brooks Kushman P.C.

(57) ABSTRACT

A system (10) and method for cylindrically forming and quenching glass sheets includes a furnace (12), a bending station (16) at the exit end of the furnace for providing cylindrical bending, a roll bending station (18) located externally of the furnace downstream from its exit end and having a lower roll conveyor (20) and an upper roll former (21) with complementary cylindrical shapes to further cylindrically bend the glass sheet, and a quench station 24 to which the formed glass sheets are conveyed for rapid cooling to provide toughening.

10 Claims, 2 Drawing Sheets

SYSTEM AND METHOD FOR CYLINDRICALLY FORMING GLASS SHEETS

BACKGROUND OF THE INVENTION

1. Field of the Invention

This invention relates to a system and a method for cylindrically forming and quenching glass sheets.

2. Background Art

Glass sheet press bending has previously been performed with a prebending that takes place after the glass sheets exit a furnace but before transfer to a press bending station where the press bending takes place. See, for example, U.S. Pat. Nos. 5,368,625 Mizusugi, 5,545,245 Mizusugi and 5,735,922 Woodward et al., which disclose a roll bending station located between the exit end of the associated furnace and a press bending station. The roll bending station disclosed by the above patents has horizontal rolls and laterally spaced sets of inclined bending rolls located downstream from the furnace with the inclined rolls provided in sets having progressively increasing inclination along the direction of conveyance to form each heated glass sheet during conveyance over the inclined rolls. See also PCT international application publication nos.: WO 02/102726 Bennett; WO 02/102727 Bennett et al.; and WO 03/010100 Bennett et al., which disclose a roll bending station located within the furnace adjacent its exit end. The roll bending station of these PCT applications has horizontal rolls and laterally spaced sets of inclined bending rolls located within the furnace adjacent its exit end with the inclined rolls provided in sets having progressively increasing inclination along the direction of conveyance to form each heated glass sheet during conveyance over the inclined rolls, and a press bending station located downstream from the furnace receives the formed glass sheet from the furnace for the press bending. Press bending of glass sheets is conventionally performed between a pair of full surface molds or between a full surface mold and a peripheral ring to provide the glass sheet bending.

As disclosed by French Patent 2221409 of inventor Maurice Nedelec, heated glass sheets have also previously been bent by conveyor rolls that are supported and rotatively driven outside of a furnace heating chamber with ends projecting inwardly into the furnace initially in a horizontal orientation. All of the rolls are subsequently simultaneously tilted to form the heated glass sheet within the heated chamber.

SUMMARY OF THE INVENTION

An object of the present invention is to provide an improved system for cylindrically forming and quenching glass sheets.

In carrying out the above object, the system of the invention for cylindrically forming and quenching glass sheets includes a furnace having entry and exit ends and including a heated chamber having a conveyor for conveying glass sheets along a direction of conveyance through the furnace between the entry end and the exit end. A bending station of the system is located within the heating chamber at the exit end of the furnace to provide bending of the heated glass sheets along a direction transverse to the direction of conveyance so each bent glass sheet has a cylindrical shape. A roll bending station of the system is located externally of the furnace downstream along the direction of conveyance from the exit end of the furnace to receive the bent glass sheets from the exit end of the furnace. The roll bending station includes a lower roll conveyor having rotatively driven rolls that extend transversely to the direction of conveyance with a cylindrically curved shape to support and convey the bent glass sheets received from the exit end of the furnace. The roll bending station has an upper roll former having rolls that collectively provide a downwardly facing cylindrically curved shape complementary to the curved shape of the lower roll conveyor. An actuator provides relative vertical movement of the upper roll former and the lower roll conveyor toward each other as each glass sheet is received by the lower roll conveyor to cooperate therewith in further cylindrically forming the glass sheet as the glass sheet is continually conveyed through the roll bending station. A quench station of the system has the formed glass sheets conveyed thereto from the roll bending station to provide rapid cooling thereof that provides toughening.

The bending station within the heating chamber at the exit end of the furnace is a roll bending station including a roll conveyor having horizontally extending conveyor rolls that are rotatively driven and spaced horizontally within the heating chamber along the direction of conveyance extending laterally with respect thereto to support and convey the heated glass sheets. A pair of sets of bending rolls of the roll bending station are spaced laterally with respect to each other within the heating chamber along the direction of conveyance. A drive mechanism supports each set of the bending rolls with the rolls thereof at progressively increasing inclinations along the direction of conveyance and provides rotational driving of the bending rolls to provide the initial cylindrical bending of the conveyed glass sheets along the direction transverse to the direction of conveyance. This drive mechanism is located externally of the furnace with the bending rolls projecting inwardly into the heating chamber of the furnace at its exit end.

The actuator of the roll bending station moves the upper roll former downwardly to provide the vertical movement that provides the further cylindrical forming of the glass sheet.

Another object of the present invention is to provide an improved method for cylindrically forming and quenching glass sheets.

In carrying out the immediately preceding object, the method for cylindrically forming and quenching glass sheets is performed by conveying a glass sheet along a direction of conveyance within a heating chamber of a furnace between an entry end thereof and an exit end thereof to provide heating thereof for forming. The heated glass sheet is cylindrically bent at the exit end of the furnace within the heating chamber to provide a cylindrically bent shape thereto along a direction transverse to the direction of conveyance. The bent glass sheet is conveyed out of the heating chamber of the furnace through the exit end thereof to a roll bending station located externally of the furnace downstream along the direction of conveyance from the exit end of the furnace. A roll bending station receives the bent glass sheet on a lower roll conveyor thereof which has a cylindrically curved shape transverse to the direction of conveyance and which is located below an upper roll former that has a cylindrical shape complementary to the cylindrical shape of the lower roll conveyor. Relative vertical movement is provided between the upper roll former and the lower roll conveyor to further cylindrically form the glass sheet therebetween as the glass sheet is continually conveyed through the roll bending station, and thereafter the formed glass sheet is conveyed from the roll bending station to a quench station for cooling that toughens the glass.

The heated glass sheet is cylindrically formed within the heating chamber at the exit end of the furnace while conveyed on horizontally extending rolls and by engaging opposite lateral sides of the glass sheet with a pair of sets of rotatively driven bending rolls that are spaced laterally from each other within the furnace heating chamber with each set having a plurality of bending rolls spaced along the direction of conveyance with progressively increasing inclinations. Each set of bending rolls is rotatively supported and driven from outside of the furnace with the bending rolls thereof projecting into the heating chamber.

The upper roll former is moved downwardly toward the lower roll conveyor to provide the relative vertical movement that provides the further cylindrical bending at the roll bending station.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
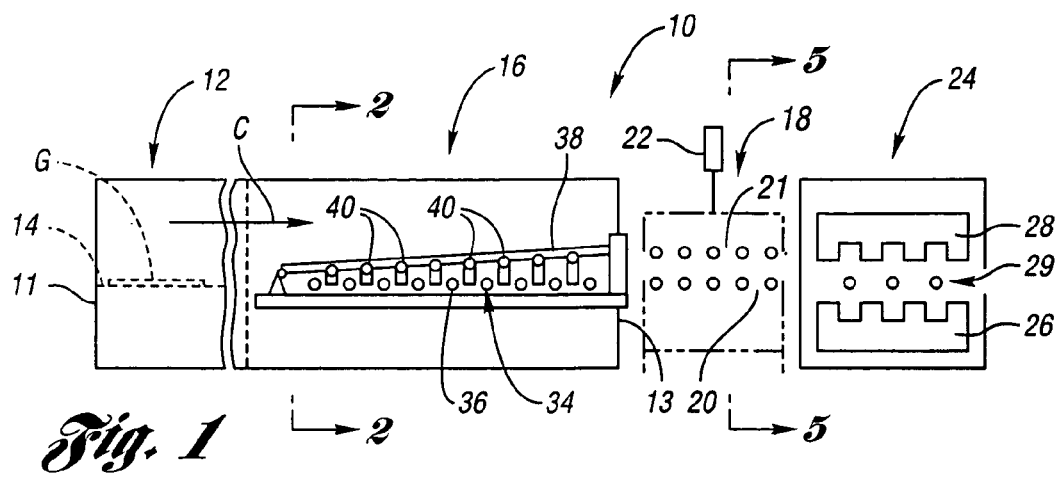
FIG. 1 is a side elevational view of a glass sheet forming and quenching system constructed in accordance with the present invention to perform the method of the invention.

With reference to FIG. 1, a glass sheet forming and quenching system generally indicated by 10 includes a furnace 12 having entry and exit ends 11 and 13 between which a conveyor 14 conveys glass sheets G along a direction of conveyance C for heating to a sufficiently high temperature for forming. The system 10 also includes a bending station 16 for initially bending the heated glass sheets to a cylindrical shape with straight line elements along the direction of conveyance, a roll bending station 18 located downstream from the furnace and having a lower roll conveyor 20 and an upper roll former 21 as well as an actuator 22 that provides relative vertical movement between the lower roll conveyor and the upper roll former to further cylindrically form the glass sheet received from the bending station 16, and a quench station 24 including lower and upper quench heads 26 and 28 between which the cylindrically formed glass sheet is received such as on a roll conveyor 29 which may be a continuation of the lower roll conveyor 20 of the roll bending station 18. After conveyance of the formed glass sheet to the quench station 24, upwardly and downwardly directed quenching gas is supplied through the lower and upper quench heads 26 and 28 to rapidly cool the formed glass sheet to provide toughening, which may be to a lesser degree for heat strengthening or a greater degree for tempering.

Both the system 10 and its method of glass sheet forming will be described in an integrated manner to facilitate an understanding of all aspects of the invention.

Figure 2:
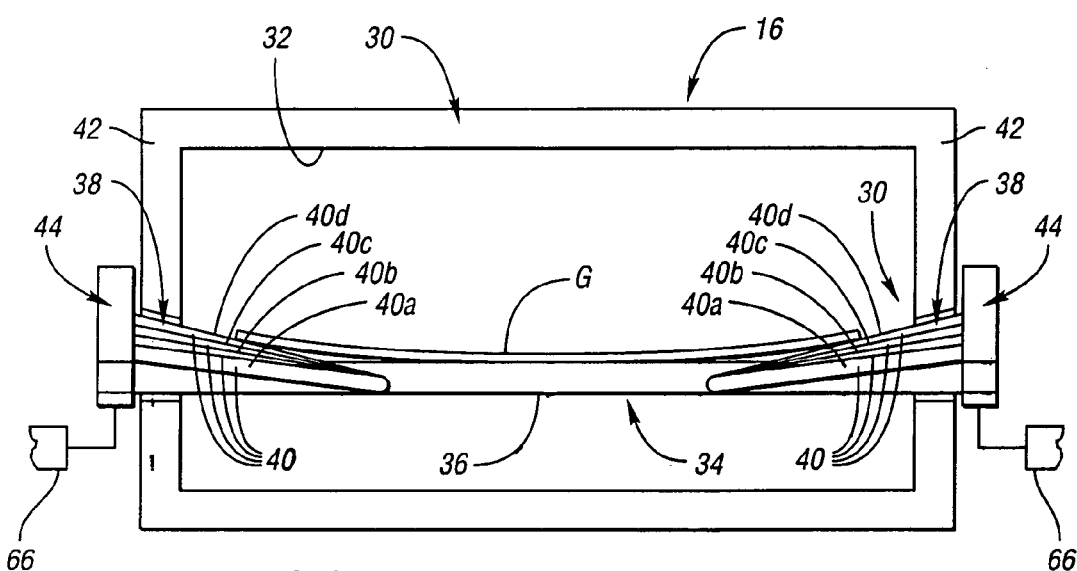
FIG. 2 is a cross sectional view taken along the direction of line 2-2 in FIG. 1 through a bending station of the system to illustrate a pair of sets of laterally spaced bending rolls that have progressively increased inclinations along the direction of conveyance to provide an initial cylindrical bending of a heated glass sheet as is conveyed through the roll bending station.

With reference to FIG. 2, the bending station 16 is preferably of the roll type and has an insulated housing 30 that defines a heating chamber 32 that is communicated with the interior of the associated furnace such that the glass sheets are not subjected to cooling by the environment prior to the roll bending. The roll bending station 16 may be constructed within the exit end 13 of the furnace or as a separate unit that is attached to the exit end of the furnace and communicated with its interior in order to prevent ambient cooling prior to the roll bending. A roll conveyor 34 of the bending station has horizontally extending conveyor rolls 36 that are rotatively driven and spaced horizontally within the heating chamber 32 of the roll bending station along the direction of conveyance extending laterally with respect thereto to support and convey a heated glass sheet to be bent. The roll bending station 18 also has a pair of sets 38 of bending rolls 40 that are spaced laterally with respect to each other along the direction of conveyance at opposite lateral sides 42 of the insulated housing. A bending roll support and drive mechanism 44 is located externally of the heating chamber to support and rotatively drive the sets of bending rolls 40. More specifically, the support and drive mechanism 44 supports and rotatively drives the bending rolls 40 of each set at progressively increasing inclinations along the direction of conveyance as illustrated by $40_a$, $40_b$, $40_c$, and $40_d$, etc.

For example, in a five foot length of the bending station, sixteen of the bending rolls 40 with a diameter of about 4.14 cm (1⅝ inches) alternate with sixteen of the horizontal conveyor rolls 36 with a diameter of about 5.08 cm (2 inches) and there is only about 0.95 cm (³⁄₁₆ inch) spacing between the rolls. While the lateral center of the conveyed glass sheet is supported by the center of the horizontal conveyor rolls 36, the increasing inclinations of the bending rolls 40 along the direction of conveyance provides engagement thereof with opposite lateral sides of the conveyed glass sheet within the heating chamber 32 to provide bending of the glass sheet along a direction transverse to the direction of conveyance as illustrated in FIG. 2. Greater inclination of the bending rolls 40 thus provides greater bending transverse to the direction of conveyance. Also, the smaller diameter bending rolls 40 are rotatively driven at a greater rate than the larger diameter horizontal conveyor rolls 36 so as to have the same roll surface speeds at the glass contact locations.

The roll support and drive mechanism 44 may be constructed in accordance with U.S. Pat. No. 6,578,383 Bennett et al., the entire disclosure of which is hereby incorporated by reference.

Figure 4:
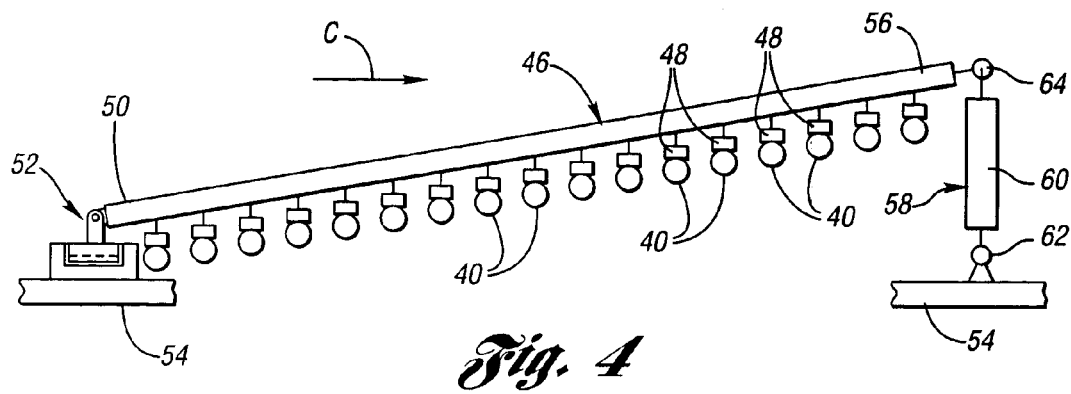
FIG. 4 is a somewhat schematic view that illustrates a connector that provides support of an associated set of bending rolls.

At each lateral side of the roll bending station, the roll support and drive mechanism 44 illustrated in FIGS. 4 includes an elongated connector 46 that extends at an inclination along the adjacent lateral side of the furnace housing and provides connection of the bending rolls 40 to each other. More specifically, each bending roll 40 has a universal connection 48 to the elongated connector 46.

As also illustrated in FIG. 4, the elongated connector 46 has an upstream end 50 including a connection 52 for mounting thereof on the associated frame 54 and has a downstream end 56 having an adjustor 58 for adjusting the elevation thereof with respect to the frame to adjust the inclination of the bending rolls 40 along the direction of conveyance. The upstream connection 52 is a universal connection that mounts the upstream end 50 of the elongated connector for rotation about orthogonal axes so as to permit pivoting of the connector and rotation about its elongated direction during the adjustment. Likewise, the universal connection 48 of each bending roll 40 to the elongated connector 46 provides pivoting thereof about orthogonal axes.

The adjuster 58 of the connector 46 may be embodied by a linear electric motor 60 for providing the adjustment of the inclination of the bending rolls. Spherical connections 62 and 64 connect the linear electric motor 60 to the frame 54 and the downstream end 56 of the connector 46.

Figure 3:
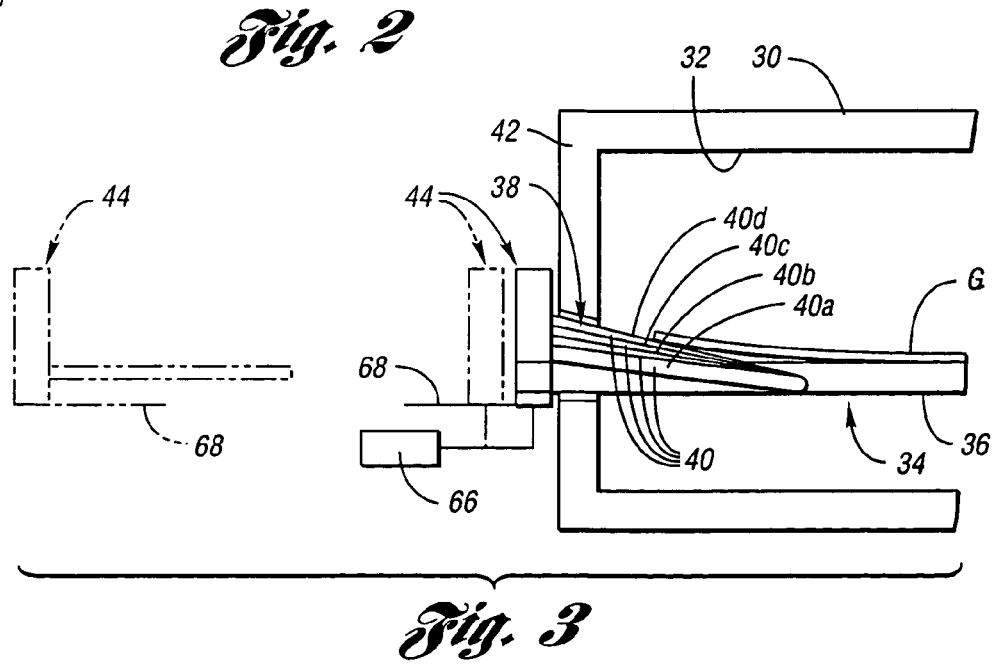
FIG. 3 is a partial cross sectional view of the bending station taken in the same direction as FIG. 2 but showing the manner in which each set of bending rolls is adjustable to accommodate for bending of glass sheets of different sizes and movable away from the roll bending station for maintenance and repair.

As illustrated in FIGS. 2 and 3, an actuator 66 provides lateral adjustment of the roll support and drive mechanism 44 with respect to the furnace to accommodate bending of glass sheets of different sizes. The bending roll support and drive mechanisms 44 can also be moved on a slideway 68 manually to a further outboard position for maintenance and repair as illustrated in FIG. 3 after first adjusting the inclination of the bending rolls 40 to the horizontal position.

Suitable seals are utilized at each lateral side 42 of the insulated housing 30 of the roll bending station 16 to prevent excessive heat loss.

Figure 5:
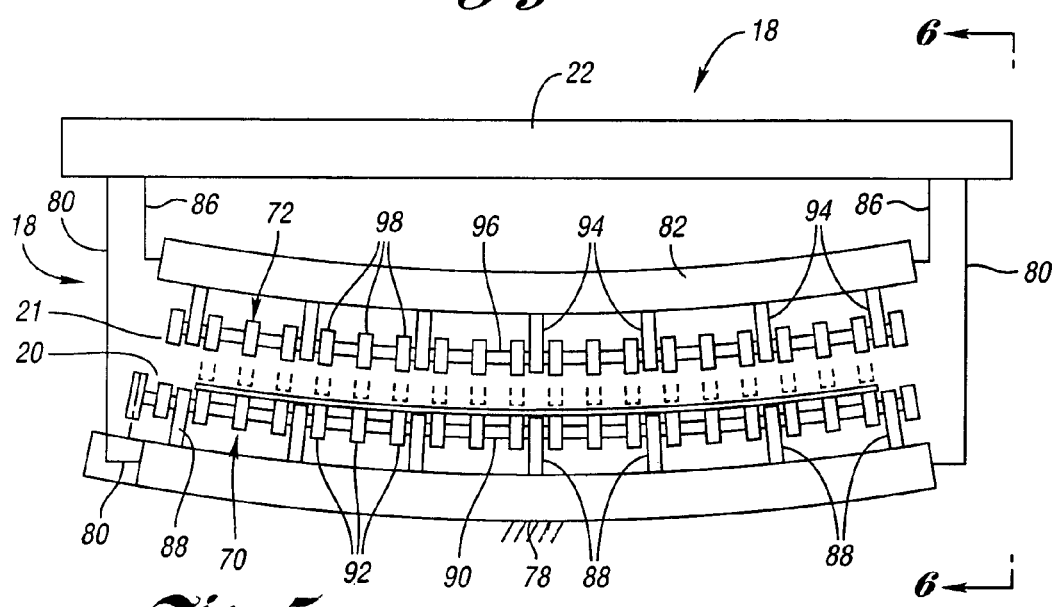
FIG. 5 is a view taken along the direction of line 5-5 in FIG. 1 to illustrate a roll bending station of the system.
Figure 6:
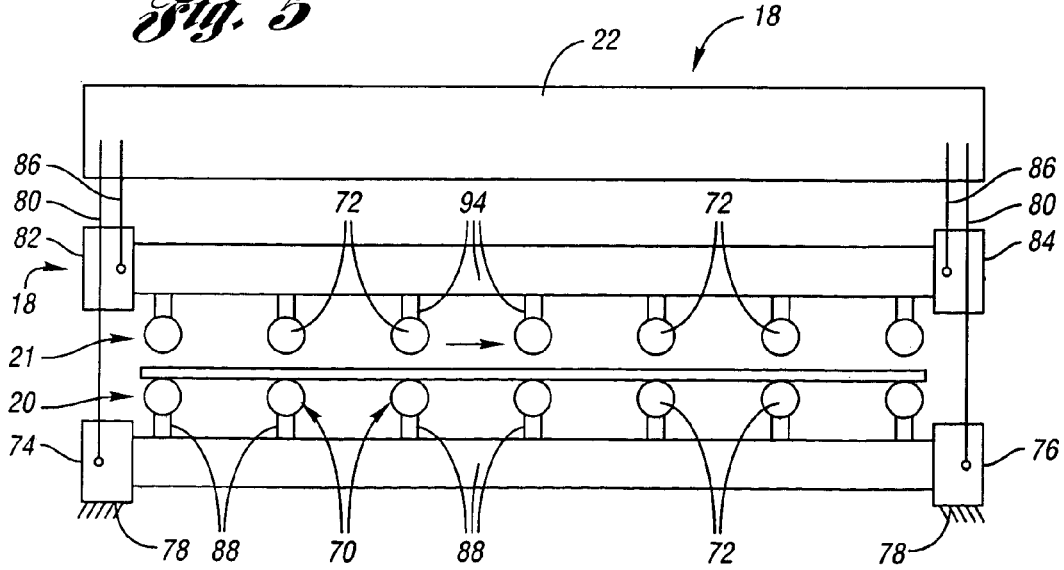
FIG. 6 is a side view of the roll bending station taken along the direction of line 6-6 in FIG. 5.

With combined reference to FIGS. 1, 5 and 6, the roll bending station 18 is located externally of the furnace 12 downstream along the direction of conveyance C from the exit end 13 of the furnace. As previously mentioned, this roll bending station 18 receives the bent glass sheets from the exit end 13 of the furnace and has its lower roll conveyor 20 provided with rotatively driven rolls 70 that extend transversely to the direction of conveyance with a cylindrically curved shape to support and convey the glass sheets received from the exit end of the furnace. The roll bending station has its upper roll former 21 provided with rolls 72 that collectively provide a downwardly facing cylindrically curved shape complementary to the curved shape of the lower roll conveyor 20. These upper rolls 72 are freewheeling such that they are not rotatively driven, however, in some applications it may be desirable to do so. Actuator 22 provides relative vertical movement of the upper roll former 21 and the lower roll conveyor 20 toward each other as each bent glass sheet is received by the lower roll conveyor to cooperate therewith in further cylindrically forming the glass sheet as the glass sheet is continually conveyed through the roll bending station 18.

The preferred construction of the roll bending station is in accordance with the U.S. Pat. No. 5,498,275 of Reunamaki entitled Glass Sheet Bending Apparatus, U.S. Pat. No. 5,556,444 of Reunamaki entitled Glass Sheet Bending Method, U.S. Pat. No. 5,697,999 of Reunamaki entitled Glass Sheet Bending Apparatus, and the U.S. Pat. No. 6,378,339 of Zalesak et al. entitled Apparatus and Method for Glass Sheet Forming, the entire disclosures of which are hereby incorporated by reference.

With reference to FIGS. 5 and 6, the lower roll conveyor 20 of the roll bending station 18 includes upstream and downstream end linkages 74 and 76 which each have a fixed center 78 (FIG. 5) and lateral ends having connectors 80 to the actuator 22. Likewise, the upper roll former 21 includes upstream and downstream and linkages 82 and 84 which each have opposite lateral ends with connectors 86 to the actuator 22. The linkages 74 and 76 of the lower roll conveyor 20 and the linkages 82 and 84 of the upper roll former 21 are preferably constructed to provide a constant radius of curvature that is adjustable by operation of the actuator 22 through the connectors 80 and 86. Actuator 22 is also operable to provide relative movement of the lower roll conveyor 20 and the upper roll former 21 toward and away from each other preferably by vertical movement of the upper roll former 21 between the solid and phantom line indicated positions of FIG. 5. More specifically, the upper roll former is positioned upwardly as the glass sheet G is initially received by the roll bending station and is then moved downwardly to cooperate with the lower roll conveyor in providing the cylindrical forming of the glass sheet. The amount of vertical movement will normally be only about 1 to 6 millimeters, just enough to ensure that the prebent glass sheet can be received within the roll bending station 18 between the lower roll conveyor 20 and the upper roll former 21 prior to vertical movement toward each other to complete the forming as the glass sheet is continually conveyed within the roll bending station 18. This final forming may provide further cylindrical bending, perform a slight amount of unbending such as lowering the lateral glass sheet edges when bent upwardly too much, or provide further cylindrical bending in certain areas and unbending in others to complete the forming to the desired shape prior to the conveyance for the quenching.

With continuing reference to FIG. 5, the lower roll conveyor 20 includes a plurality of elongated supports 88 that extend along the direction of conveyance between the upstream and downstream end linkages 74 and 76 in a laterally spaced relationship to each other. The lower rolls 70 each include an elongated shaft 90 that extends between the elongated supports 88 to support roll discs 92 is a laterally spaced relationship from each other. Likewise, the upper roll former 21 includes elongated supports 94 that extend between the upstream and downstream end linkages 82 and 84 in a laterally spaced relationship from each other, and each roll 72 includes a flexible shaft 96 that extends between and is rotatably supported by the supports 94 to support laterally spaced roll discs 98. Also, the lower rolls 70 and upper rolls 72 can be horizontally offset from each other along the direction of conveyance as disclosed by the aforementioned U.S. Pat. No. 6,378,339 of Zalesak et al. which has been incorporated by reference. This horizontal offset of the lower and upper rolls helps in maintaining straightness of the cylindrically formed glass sheet along the direction of conveyance.

The bending system and method of the invention provides a faster cycle time and reduced job change shut down time as compared to press bending systems. Job changes can also be completed much faster than with gas hearth bending system whose hearth blocks must be switched to provide different curvatures.

While the preferred embodiments and method of operation thereof have been described in detail, those familiar with the art to which this invention relates will recognize various alternative ways of practicing the invention as defined by the following claims.

What is claimed is:

1. A system for cylindrically forming and quenching glass sheets, comprising:

a furnace having entry and exit ends and including a heating chamber having a conveyor for conveying glass sheets along a direction of conveyance through the furnace between the entry end and the exit end;

a bending station located within the heating chamber at the exit end of the furnace to provide bending of the heated glass sheets along a direction transverse to the direction of conveyance so each bent glass sheet has a cylindrical shape;

a roll bending station located externally of the furnace downstream along the direction of conveyance from the exit end of the furnace to receive the bent glass sheets from the exit end of the furnace, the roll bending station including a lower roll conveyor having rotatively driven rolls that extend transversely to the direction of conveyance with a cylindrically curved shape to support and convey the bent glass sheets received from the exit end of the furnace, the roll bending station having an upper roll former having rolls that collectively provide a downwardly facing cylindrically curved shape complementary to the curved shape of the lower roll conveyor, and an actuator that provides relative vertical movement of the upper roll former and the lower roll conveyor toward each other as each bent glass sheet is received by the lower roll conveyor to cooperate therewith in further cylindrically forming the glass sheet as the glass sheet is continually conveyed through the roll bending station; and a quench station to which the formed glass sheets are conveyed from the roll bending station for rapidly cooling thereof to provide toughening.

2. A system for cylindrically forming and quenching glass sheets as in claim 1 wherein the bending station within the heating chamber at the exit end of the furnace is a roll bending station including a roll conveyor having horizontally extending conveyor rolls that are rotatively driven and spaced horizontally within the heating chamber along the direction of conveyance extending laterally with respect thereto to support and convey the heated glass sheets, the roll bending station within the heating chamber at the exit end of the furnace having a pair of sets of bending rolls that are spaced laterally with respect to each other within the heating chamber along the direction of conveyance, and a drive mechanism that supports each set of the bending rolls with the rolls thereof at progressively increasing inclinations along the direction of conveyance and that provides rotational driving of the bending rolls to provide the initial cylindrical bending of the conveyed glass sheets along the direction transverse to the direction of conveyance.

3. A system for cylindrically forming and quenching glass sheets as in claim 2 wherein the drive mechanism is located externally of the furnace with the bending rolls projecting inwardly into the heating chamber of the furnace at its exit end.

4. A system for cylindrically forming and quenching glass sheets as in claim 1 wherein the roll bending station actuator moves the upper roll former downwardly to provide the vertical movement that provides the further cylindrical forming of the glass sheet.

5. A system for cylindrically forming and quenching glass sheets, comprising:

a furnace having entry and exit ends and including a heating chamber having a conveyor for conveying glass sheets along a direction of conveyance through the furnace between the entry end and the exit end;

a bending station located within the heating chamber at the exit end of the furnace and including a roll conveyor having horizontally extending conveyor rolls that are rotatively driven and spaced horizontally within the heating chamber along the direction of conveyance extending laterally with respect thereto to support and convey the heated glass sheets, the bending station also having a pair of sets of bending rolls that are spaced laterally with respect to each other within the heating chamber along the direction of conveyance, a drive mechanism that is located externally of the furnace and supports each set of the bending rolls with the rolls thereof extending into the furnace at progressively increasing inclinations along the direction of conveyance, and the drive mechanism providing rotational driving of the bending rolls to provide initial cylindrical bending of the conveyed glass sheets along the direction transverse to the direction of conveyance so each bent glass sheet has a cylindrical shape;

a roll bending station located externally of the furnace downstream along the direction of conveyance from the exit end of the furnace to receive the bent glass sheets from the exit end of the furnace, the roll bending station including a lower roll conveyor having rotatively driven rolls that extend transversely to the direction of conveyance with a cylindrically curved shape to support and convey the bent glass sheets received from the exit end of the furnace, the roll bending station having an upper roll former having rolls that collectively provide a downwardly facing cylindrically curved shape complementary to the curved shape of the lower roll conveyor, and an actuator that moves the upper roll former vertically as each bent glass sheet is received by the lower roll conveyor so the lower roll conveyor and upper roll former cooperate to further cylindrically form the glass sheet as the glass sheet is continually conveyed through the roll bending station; and a quench station to which the cylindrically formed glass sheets are conveyed from the roll bending station for rapidly cooling thereof to provide toughening.

6. A method for cylindrically forming and quenching glass sheets comprising:

conveying a glass sheet along a direction of conveyance within a heating chamber of a furnace between an entry end thereof and an exit end thereof to provide heating thereof for forming;

cylindrically bending the heated glass sheet at the exit end of the furnace within the heating chamber to provide a cylindrically bent shape thereto along a direction transverse to the direction of conveyance;

conveying the bent glass sheet out of the heating chamber of the furnace through the exit end thereof to a roll bending station located externally of the furnace downstream along the direction of conveyance from the exit end of the furnace;

receiving the bent glass sheet at the roll bending station on a lower roll conveyor thereof which has a cylindrically curved shape transverse to the direction of conveyance and which is located below an upper roll former that has a cylindrical shape complementary to the cylindrical shape of the lower roll conveyor;

providing relative vertical movement between the upper roll former and the lower roll conveyor to further cylindrically form the glass sheet therebetween as the glass sheet is continually conveyed through the roll bending station; and thereafter conveying the formed glass sheet from the roll bending station to a quench station for cooling that toughens the glass.

7. A method for cylindrically forming and quenching glass sheets as in claim 6 wherein the heated glass sheet is cylindrically formed within the heating chamber at the exit end of the furnace while conveyed on horizontally extending rolls and by engaging opposite lateral sides of the glass sheet with a pair of sets of rotatively driven bending rolls that are spaced laterally from each other within the furnace heating chamber with each set having a plurality of bending rolls spaced along the direction of conveyance with progressively increasing inclinations.

8. A method for cylindrically forming and quenching glass sheets as in claim 7 wherein each set of bending rolls is rotatively supported and driven from outside of the furnace with the bending rolls thereof projecting into the heating chamber.

9. A method for cylindrically forming and quenching glass sheets as in claim 8 wherein the upper roll former is moved downwardly toward the lower roll conveyor to provide the relative vertical movement that provides the further cylindrical bending at the roll bending station.

10. A method for cylindrically forming and quenching glass sheets comprising:

conveying a glass sheet along a direction of conveyance within a heating chamber of a furnace between an entry end thereof and an exit end thereof to provide heating thereof for forming;

cylindrically bending the heated glass sheet at the exit end of the furnace within the heating chamber by engaging opposite lateral sides of the glass sheet with a pair of sets of rotatively driven bending rolls that are spaced laterally from each other within the furnace heating chamber with each set having a plurality of bending rolls spaced along the direction of conveyance with progressively increasing inclinations to provide a cylindrically bent shape thereto along a direction transverse to the direction of conveyance;

conveying the bent glass sheet out of the heating chamber of the furnace through the exit end thereof to a roll bending station located externally of the furnace downstream along the direction of conveyance from the exit end of the furnace;

receiving the bent glass sheet at the roll bending station on a lower roll conveyor thereof which has a cylindrically curved shape transverse to the direction of conveyance and which is located below an upper roll former that has a cylindrical shape complementary to the cylindrical shape of the lower roll conveyor;

moving the upper roll former vertically to cooperate with the lower roll conveyor to further cylindrically form the glass sheet therebetween as the glass sheet is continually conveyed through the roll bending station; and thereafter conveying the formed glass sheet from the roll bending station to a quench station for cooling that toughens the glass.

* * * * *